US010674037B2

(12) United States Patent
Haruta

(10) Patent No.: US 10,674,037 B2
(45) Date of Patent: Jun. 2, 2020

(54) IMAGE PROCESSING APPARATUS, IMAGE PROCESSING METHOD, AND STORAGE MEDIUM WITH HALFTONE PROCESSING USING DITHER MATRIX OF DOT CONCENTRATION TYPE OR DITHER MATRIX OF DOT DISTRIBUTION TYPE

(71) Applicant: CANON KABUSHIKI KAISHA, Tokyo (JP)

(72) Inventor: Kenichirou Haruta, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/005,834

(22) Filed: Jun. 12, 2018

(65) Prior Publication Data

US 2019/0014232 A1 Jan. 10, 2019

(30) Foreign Application Priority Data

Jul. 5, 2017 (JP) .................................. 2017-131875

(51) Int. Cl.
*H04N 1/405* (2006.01)

(52) U.S. Cl.
CPC ......... *H04N 1/4051* (2013.01); *H04N 1/4052* (2013.01); *H04N 1/4053* (2013.01); *H04N 1/4055* (2013.01)

(58) Field of Classification Search
None
See application file for complete search history.

(56) References Cited

U.S. PATENT DOCUMENTS

| 4,736,254 A | 4/1988 | Kotera et al. |
| 5,111,310 A | 5/1992 | Parker et al. |
| 5,418,618 A * | 5/1995 | Kagawa .............. H04N 1/4055 347/252 |

(Continued)

FOREIGN PATENT DOCUMENTS

| JP | 09191411 A * | 7/1997 |
| JP | H09-191411 A | 7/1997 |

(Continued)

OTHER PUBLICATIONS

Muramatsu, Mizuki, Image Forming Device, JP-09-191411 English Translation, 1997, par 0029-0030 (Year: 1997).*

(Continued)

*Primary Examiner* — Miya J Williams
(74) *Attorney, Agent, or Firm* — Venable LLP

(57) ABSTRACT

The image processing apparatus of the present invention includes: a first memory configured to store a first threshold value matrix used for halftone processing; a second memory configured to store a second threshold value matrix that is a threshold value matrix used for halftone processing and whose size is larger than the first threshold value matrix; and at least one circuit, the at least one circuit causing processing below: performing halftone processing for image data by using the first threshold value matrix or the second threshold value matrix selected based on attribute information on the image data, and the first threshold value matrix includes threshold values whose maximum number of bits is N and the second threshold value matrix includes threshold values whose maximum number of bits is M (M<N).

11 Claims, 11 Drawing Sheets

(56) References Cited

U.S. PATENT DOCUMENTS

| | | | |
|---|---|---|---|
| 6,100,996 A | 8/2000 | Amano et al. | |
| 2002/0054396 A1* | 5/2002 | Tanaka | H04N 1/40062 358/519 |
| 2004/0184079 A1* | 9/2004 | Sakamoto | G06K 15/00 358/1.15 |
| 2007/0273929 A1* | 11/2007 | Hayashi | H04N 1/4051 358/3.13 |
| 2014/0132992 A1* | 5/2014 | Li | H04N 1/40087 358/3.06 |
| 2014/0285851 A1* | 9/2014 | Kawamoto | G06K 15/1881 358/3.09 |
| 2015/0108220 A1* | 4/2015 | Gu | G06K 19/06037 235/462.11 |
| 2018/0211143 A1 | 7/2018 | Haruta | |

FOREIGN PATENT DOCUMENTS

| | | |
|---|---|---|
| JP | H09-247426 A | 9/1997 |
| JP | 2011-234344 A | 11/2011 |

OTHER PUBLICATIONS

Robert A. Ulichney, "Dithering with Blue Noise," Proceedings of the IEEE, vol. 76, No. 1, Jan. 1988, pp. 56-79.

May 14, 2019 Japanese Official Action in Japanese Patent Appln. No. 2017-131875.

* cited by examiner

IMAGE PROCESSING APPARATUS, IMAGE PROCESSING METHOD, AND STORAGE MEDIUM WITH HALFTONE PROCESSING USING DITHER MATRIX OF DOT CONCENTRATION TYPE OR DITHER MATRIX OF DOT DISTRIBUTION TYPE

BACKGROUND OF THE INVENTION

Field of the Invention

The present invention relates to an image processing apparatus that performs halftone processing, an image processing method, and a storage medium.

Description of the Related Art

Conventionally, as a gradation reproduction method, the error diffusion method is well known. The error diffusion method is a method of saving an image density by converting an input image into a binary or multivalued image by performing a comparison with a threshold value for each pixel and diffusing an error (quantization error) that occurs between an input value and an output value during the course thereof to a predetermined pixel group in the vicinity thereof by giving a weight thereto. This error diffusion method requires a process of feedback for diffusing an error as described above, and therefore, in the case where an increase in the processing speed is desired, the error diffusion method is not appropriate as a gradation reproduction method.

Consequently, as a gradation reproduction method whose processing is simple and whose processing speed is high, the independent determination type dither method is known. The independent determination type dither method is a method of determining an output value by performing a one point-to-one point comparison between a pixel value of an input image and a threshold value. With this independent determination type dither method, it is possible to process only a pixel of interest independently and processing for a surrounding pixel is not performed, and therefore, it is possible to increase the processing speed. It is possible to classify the independent determination type dither method into the random dither method and the systematic dither method according to a difference in how to give a threshold value.

The random dither method is a method of randomly changing a threshold value for each pixel. However, a dot pattern generated by this method has white noise characteristics and has an advantage that moire does not occur, but graininess is conspicuous, and therefore, image quality is poor and is currently hardly used.

On the other hand, the systematic dither method is a method that uses a threshold value matrix (also called dither matrix, mask, and so on) in which threshold values are arrayed and is further classified into the dot concentration type and the dot distribution type according to the way the array threshold values of the threshold value matrix are arrayed.

Here, the dot concentration type is designed so that as the number of tone levels increases, the dot arrays cluster together and increase in number at the position corresponding to the center of the threshold value matrix. Further, the dot distribution type is designed so that the dot arrays of an output pattern are distributed spatially and as a representative one, the Bayer type systematic dither method is known conventionally (U.S. Pat. No. 4,736,254).

In the Bayer type systematic dither method, the threshold value array is very regular, and therefore, in the case where halftone processing is performed for an input image at a uniform gray level, a very regular output pattern is generated for input images of all tone levels. Because of this, uniformity of a dot pattern is good but in the case where the definition of an output device is low, a texture (dither pattern) that offends the eye is perceived in the period of the size of the threshold value matrix (16×16 for 256 tone levels). Further, in the case where a periodic pattern is included in an input image, such a problem that moire may occur in an output image arises.

For this problem, it has come to be known that excellent image quality is obtained in the case where the dot pattern of an output image is a blue noise pattern (R. A. Ulichney, Dithering with Blue Noise, Proc. IEEE, vol. 76, No. 1, p. 56). The blue noise pattern is characterized by having a power spectrum (blue noise characteristics) made up of noise components aperiodic, isotropic and having less low frequency components. Ulichney contrived the perturbed error diffusion method by introducing irregularity to the conventional error diffusion method, and thus achieved the blue noise pattern.

Then, the method proposed to achieve this blue noise pattern by using the systematic dither method is a blue noise mask method (U.S. Pat. No. 5,111,310). In the case where an input image having a gray level whose mask size is uniform is processed by using the blue noise mask method, the output dot pattern has the blue noise characteristics. Because of this, moire does not occur as in the case of the perturbed error diffusion method of Ulichney and a feeling of graininess is small compared to the random dither method.

It is generally known that it is difficult for a human eye to visually recognize a pattern in a period of 10 mm or more because of the characteristics of the human eyesight. Because of this, in order to obtain preferable blue noise characteristics by the blue noise mask method, for example, it is necessary to generate a dither matrix whose size is 256×256 or more with 600 dpi (as will be described later in FIG. 4A to FIG. 4F). However, in the case where a dither matrix whose size is 256×256 or more is generated, there is such a problem that the memory capacity (circuit scale) increases.

The present invention has been made in view of the above-described conventional problem and an object is to reduce the circuit scale or calculation cost on the premise that necessary image quality is maintained in halftone processing.

SUMMARY OF THE INVENTION

In order to achieve the above-described object, the image processing apparatus of the present invention includes: a first memory configured to store a first threshold value matrix used for halftone processing; a second memory configured to store a second threshold value matrix that is a threshold value matrix used for halftone processing and whose size is larger than the first threshold value matrix; and at least one circuit, the at least one circuit causing processing below: performing halftone processing for image data by using the first threshold value matrix or the second threshold value matrix selected based on attribute information on the image data, and the first threshold value matrix includes threshold values whose maximum number of bits is N and the second threshold value matrix includes threshold values whose maximum number of bits is M (M<N).

Further features of the present invention will become apparent from the following description of exemplary embodiments with reference to the attached drawings.

DESCRIPTION OF THE EMBODIMENTS

First Embodiment

In the following, an embodiment of the present invention is explained by using drawings and a flowchart. However, the technical scope of the present invention is not limited to the present embodiment.

[Image Forming System]

Figure 1:
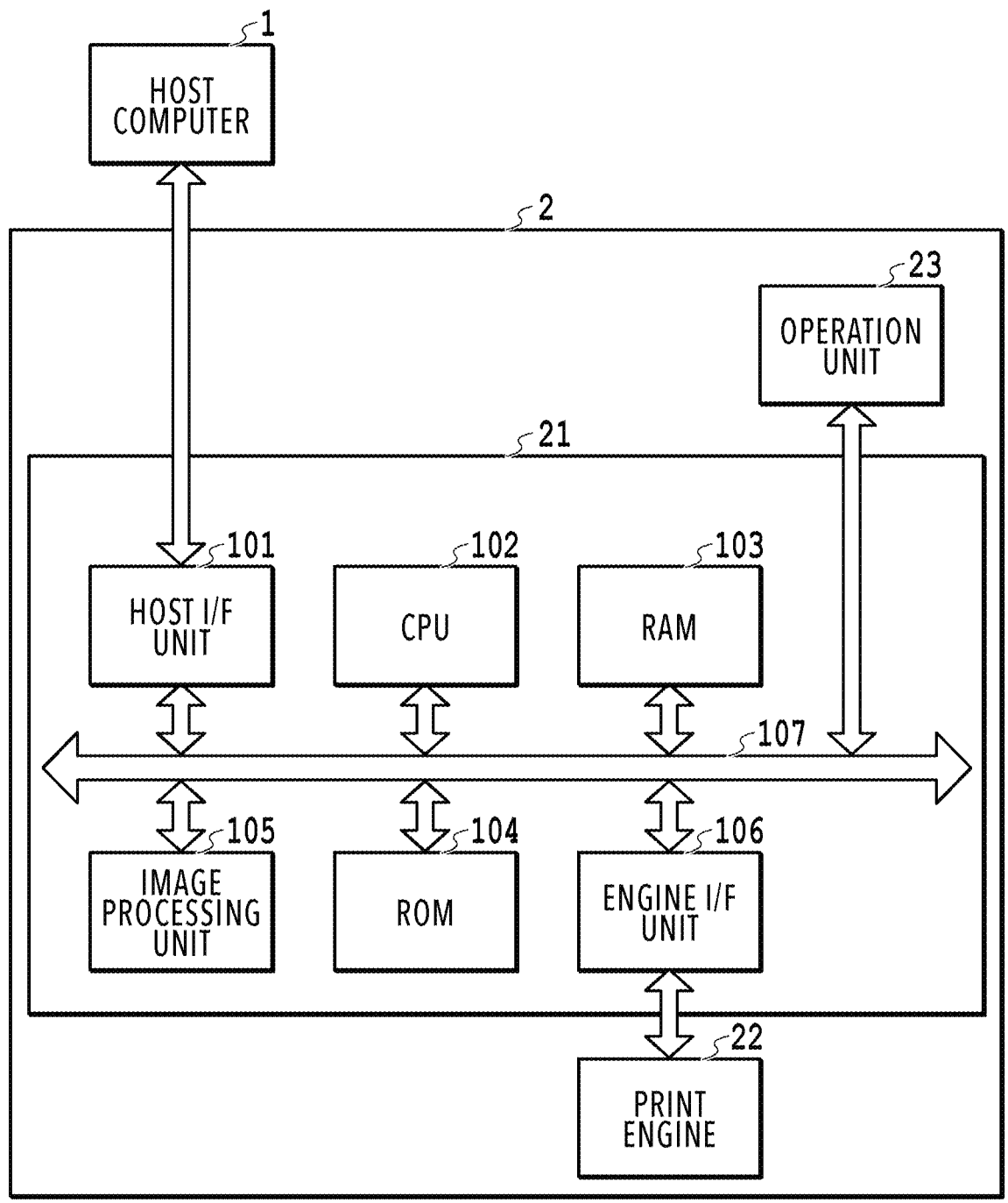
FIG. 1 is a block diagram showing a configuration of an image forming system including an image processing apparatus according to a first embodiment of the present invention.

FIG. 1 is a block diagram showing a configuration of an image forming system including an image processing apparatus according to the present embodiment. The image forming system shown in FIG. 1 includes a host computer 1 and an image forming apparatus 2. As shown in FIG. 1, the image forming apparatus 2 includes a controller 21, a print engine 22, and an operation unit 23.

The host computer 1 is a computer, such as a PC (Personal Computer) and a WS (Workstation). Then, an image or a document generated by a software application, such as a printer driver, set in the host computer 1 is transmitted to the image forming apparatus 2 as PDL data via a network, such as a LAN.

As described above, the image forming apparatus 2 includes the controller 21, the print engine 22, and the operation unit 23 and receives PDL data transmitted from the host computer 1 by the controller 21 (to be more exact, host I/F unit 101).

The controller 21 is connected to the print engine 22 and in the case of receiving PDL data from the host computer 1, the controller 21 converts the PDL data into print data that can be processed in the print engine 22 and outputs the print data to the print engine 22.

The print engine 22 performs printing of an image based on print data output from the controller 21. In the present embodiment, it is assumed that the print engine 22 is an electrophotographic print engine.

The operation unit 23 is used by a user, for example, for performing operations (instructions), such as selection of various functions. The operation unit 23 includes a liquid crystal display on the surface of which a touch panel is provided, a keyboard on which various keys, such as a start key, a stop key, and a ten key, are arranged, various switches for operations, an LED display device, and so on.

Next, the controller 21 of the image forming apparatus 2 is explained in detail. As shown in FIG. 1, the controller 21 includes a host I/F (interface) unit 101, a CPU 102, a RAM 103, a ROM 104, an image processing unit 105, an engine I/F unit 106, and an internal bus 107.

The host I/F unit 101 is an interface for receiving PDL data transmitted from the host computer 1. The CPU 102 performs various kinds of processing, to be described later, as well as controlling the entire image forming apparatus 2 by using programs and data stored in the RAM 103 or the ROM 104.

The RAM (Random Access Memory) 103 includes a work area for the CPU 102 to perform various kinds of processing. The ROM (Read Only Memory) 104 stores programs for causing the CPU 102 to perform various kinds of processing, to be described later, and in addition thereto, data (for example, setting data of the controller 21, and the like).

The image processing unit 105 functions as an image processing apparatus, and the image processing unit 105 is an ASIC or ASIP having a function of performing image processing for printing for PDL data received by the host I/F unit 101 in accordance with the setting from the CPU 102 and converting the PDL data into print data that can be processed in the print engine 22 (generates print data). In more detail, the image processing unit 105 generates image data having a plurality of color components per pixel by performing rasterize for the received PDL data. Here, the plurality of color components refers to color components independent of one another in a color space of, for example, such as RGB (red, green, blue). Further, the image data has a 10-bit (1,024 tone levels) value per color component for each pixel. That is, the image data is multivalued bitmap data including multivalued pixels.

The image processing unit 105 generates print data by performing image processing, such as color conversion from an RGB color space into a CMYK (cyan, magenta, yellow, black) color space and halftone processing, by using generated image data and attribute information. The processing in the image processing unit 105 will be described in detail by using FIG. 2, to be described later.

The engine I/F unit 106 is an interface that transmits print data generated by the image processing unit 105 to the print engine 22. The internal bus 107 is a system bus that connects each unit (host I/F unit 101 to engine I/F unit 106) described above.

[Image Processing Unit]

Figure 2:
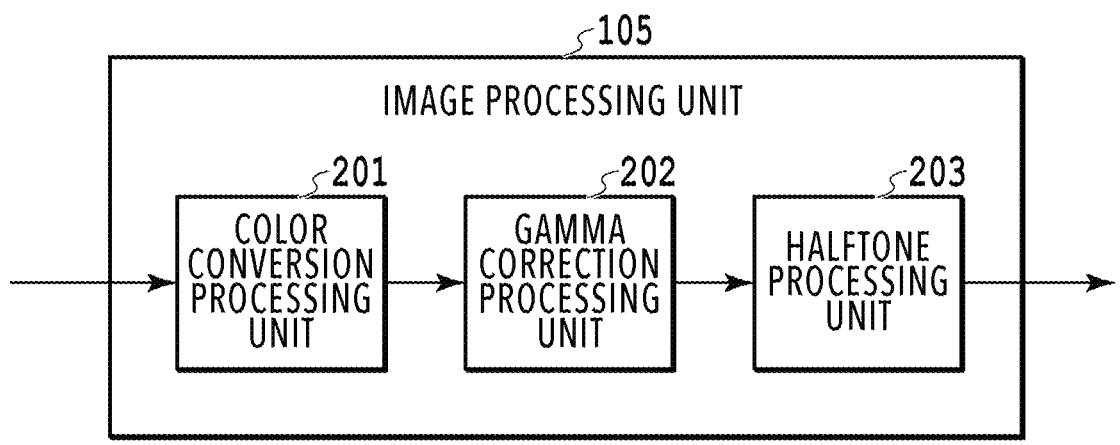
FIG. 2 is a block diagram showing a configuration of an image processing unit.

Next, details of the image processing unit 105 of the image forming apparatus 2 are explained. In FIG. 2, image processing for printing (that is, processing to generate print data) performed for RGB multivalued image data generated by performing rasterize processing for PDL data is explained.

The image processing unit 105 includes a color conversion processing unit 201, a gamma correction processing unit 202, and a halftone processing unit 203 for performing image processing for printing as shown in FIG. 2.

The color conversion processing unit 201 performs color conversion processing from an RGB color space into a CMYK color space for multivalued image data. By this color conversion processing, CMYK image data having a 10-bit (1,024 tone levels) multivalued density value (also called tone level value, signal value) per pixel is generated. The generated CMYK image data is stored in a buffer, not shown schematically, within the color conversion processing unit 201.

The gamma correction processing unit 202 corrects input image data by using a one-dimensional lookup table so that desired density characteristics are obtained at the time of the image data for which the halftone processing has been performed in the halftone processing unit 203 being transferred onto printing paper. In the present embodiment, as an example thereof, a one-dimensional lookup table having linearity, such as one in which an input is output as it is, is used. It is possible for the CPU 102 to rewrite the lookup table in accordance with a change in the state of the print engine 22.

The halftone processing unit 203 performs halftone processing for image data for which gamma correction has been performed by the gamma correction processing unit 202 and outputs the image data to the engine I/F unit 106 as print data.

[Halftone Processing]

Next, by using FIG. 3 to FIG. 7A and FIG. 7B, the configuration and processing of the halftone processing unit 203 in the image processing apparatus according to the present embodiment are explained. In the present embodiment, explanation is given by taking the number of pixels in the main scan of an input image as Xmax and the number of pixels in the sub scan as Ymax. Further, in the present embodiment, only one color of the four colors of CMYK is explained, but it is assumed that the halftone processing is performed for all CMYK.

[Configuration of Halftone Processing Unit]

Figure 3:
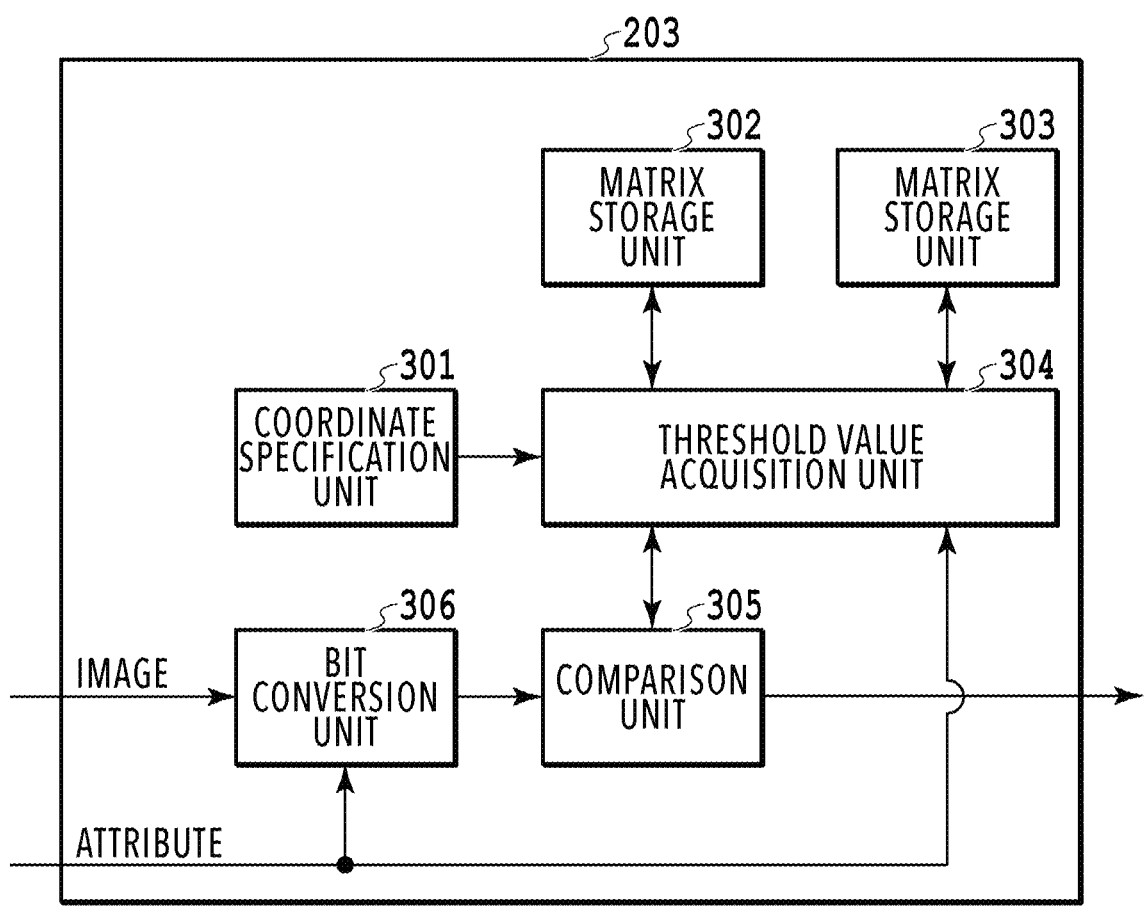
FIG. 3 is a block diagram showing a configuration of a halftone processing unit.

FIG. 3 is a block diagram of the halftone processing unit 203. A coordinate specification unit 301 specifies coordinates of an image (pixel of interest) in the case where halftone processing is performed. After specifying the coordinates of the pixel of interest, the coordinate specification unit 301 transmits the specified coordinates to a threshold value acquisition unit 304 (notifies a threshold value acquisition unit 304 of the specified coordinates). A dot concentration type matrix storage unit 302 stores (holds) a threshold value th set by a predetermined number of bits (for example, M bits) at coordinates (X, Y) selected in the case where attribute information is determined to be image or graphics. A matrix storage unit 303 of a blue noise mask stores (holds) the threshold value th set by a predetermined number of bits (for example, N bits) at the coordinates (X, Y) selected in the case where attribute information is determined to be character or line. The number of bits of the threshold value th stored in the matrix storage unit 303 of a blue noise mask is set to a value smaller than the number of bits of the threshold value th stored in the dot concentration type matrix storage unit 302. That is, the numbers of bits are set so that M>N holds.

In the case of being notified of the coordinate information (X, Y) by the coordinate specification unit 301, the threshold value acquisition unit 304 acquires the threshold value corresponding to the image position (coordinate information) from the dot concentration type matrix storage unit 302 or the matrix storage unit 303 of a blue noise mask in accordance with the attribute.

A comparison unit 305 compares the pixel value of an image IN (X, Y) acquired from a bit conversion unit 306 and the threshold value th acquired from the dot concentration type matrix storage unit 302 or the matrix storage unit 303 of a blue noise mask. In the case where the results of the comparison indicate that the pixel value of the image IN (X, Y) is larger than the threshold value th, the comparison unit 305 returns 1 and in the case where the pixel value of the image IN (X, Y) is smaller than or equal to the threshold value th, returns 0. The bit conversion unit 306 performs bit conversion in accordance with the attribute information. In the present embodiment, the bit conversion unit 306 performs bit conversion so as to match the number of bits of the pixel value of the pixel of interest with the number of bits of the threshold value held in the matrix storage unit 303 of a blue noise mask.

[Characteristics and Threshold Value of Threshold Value Matrix]

Next, by using FIG. 4A to FIG. 4F and FIG. 5A to FIG. 5F, characteristics of the dot concentration type threshold value matrix having amplitude modulation characteristics and the threshold value matrix of a blue noise mask having frequency modulation characteristics are explained.

Figure 4C:
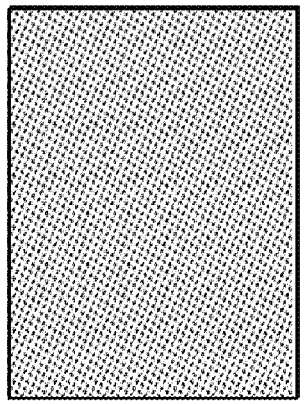
FIG. 4C is a diagram for explaining an influence of a difference in size of a dot concentration type threshold value matrix.
Figure 4F:
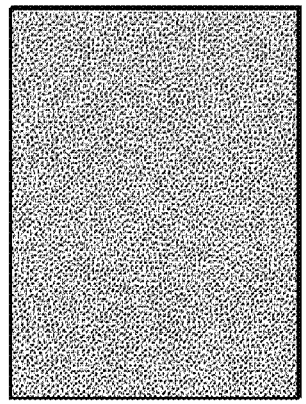
FIG. 4F is a diagram for explaining an influence of a difference in size of a threshold value matrix of a blue noise mask.
Figure 4B:
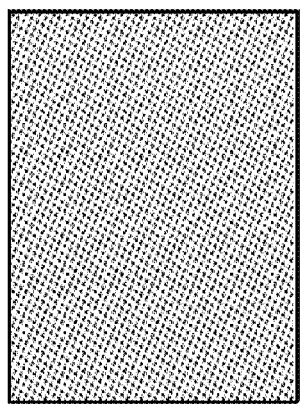
FIG. 4B is a diagram for explaining an influence of a difference in size of a dot concentration type threshold value matrix.
Figure 4E:
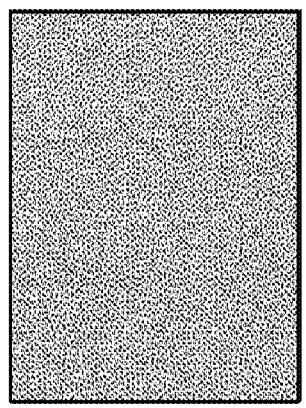
FIG. 4E is a diagram for explaining an influence of a difference in size of a threshold value matrix of a blue noise mask.
Figure 4A:
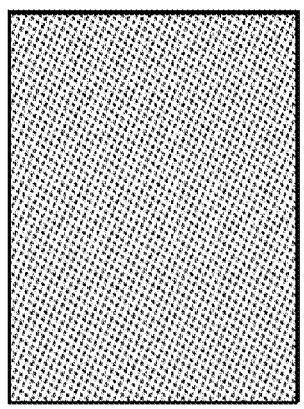
FIG. 4A is a diagram for explaining an influence of a difference in size of a dot concentration type threshold value matrix.
Figure 4D:
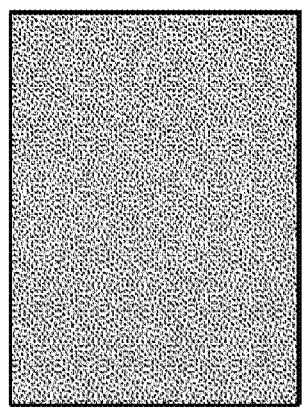
FIG. 4D is a diagram for explaining an influence of a difference in size of a threshold value matrix of a blue noise mask.

FIG. 4A to FIG. 4F are diagrams for explaining the influence of a difference in size between the dot concentration type threshold value matrix and the threshold value matrix of a blue noise mask. FIG. 4A, FIG. 4B, and FIG. 4C illustrate the results of the halftone processing by the dot concentration type threshold value matrix at a predetermined density. Further, FIG. 4D, FIG. 4E, and FIG. 4F illustrate the results of the halftone processing by the threshold value matrix of a blue noise mask at a predetermined density. In FIG. 4A and FIG. 4D, the size of the threshold value matrix is set to 64×64, in FIG. 4B and FIG. 4E, the size of the threshold value matrix is set to 128×128, and in FIG. 4C and FIG. 4F, the size of the threshold value matrix is set to 256×256.

First, by referring to FIG. 4A, FIG. 4B, and FIG. 4C, it is known that the processing results are not so different irrespective of the size of the threshold value matrix. The reason is that, for example, in the case of a dot concentration type threshold value matrix with 134 lines 27 degrees, the size of the threshold value matrix forming one halftone dot is 20×4, which means that the size (periodicity) of the threshold value matrix forming a halftone dot is sufficiently smaller than 64×64.

Next, by referring to FIG. 4D, FIG. 4E, and FIG. 4F, the periodicity of the threshold value matrix is conspicuous in FIG. 4D, but as shown in FIG. 4E and FIG. 4F, as the size of the threshold value matrix becomes large, the periodicity of the threshold value matrix becomes less conspicuous.

This results from the presence of characteristics that the human eyesight sensitivity is high in the frequency band near 5 to 200 [cycle/inch] and this frequency band is the most conspicuous, and in FIG. 4E and FIG. 4F, the period becomes shorter in this order and the frequency band becomes distant from this frequency band.

In the following, explanation of FIG. 4D, FIG. 4E, and FIG. 4F is supplemented. The size of the threshold value matrix in FIG. 4D is 64, and therefore, the periodicity of the threshold value matrix is 600 dpi/64=9.3 [cycle/inch] and is conspicuous to the human eye. The size of the threshold value matrix in FIG. 4E is 128, and therefore, the periodicity of the threshold value matrix is 600 dpi/128=4.7 [cycle/inch] and is conspicuous to the human eye. The size of the threshold value matrix in FIG. 4F is 256, and therefore, the periodicity of the threshold value matrix is 600 dpi/256=2.3 [cycle/inch] and is less conspicuous.

Figure 5C:
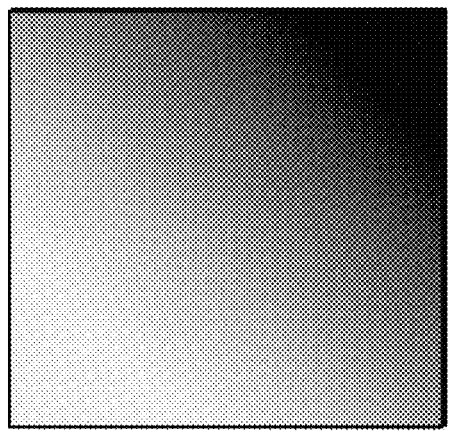
FIG. 5C is a diagram for explaining an influence of a difference in the number of tone levels of a dot concentration type threshold value matrix.
Figure 5F:
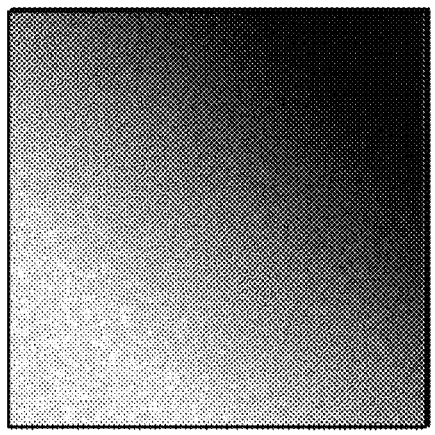
FIG. 5F is a diagram for explaining an influence of a difference in the number of tone levels of a threshold value matrix of a blue noise mask.
Figure 5B:
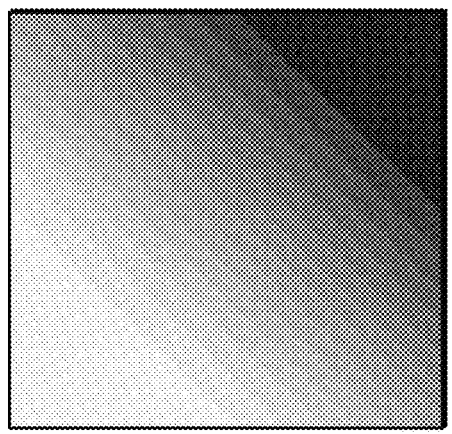
FIG. 5B is a diagram for explaining an influence of a difference in the number of tone levels of a dot concentration type threshold value matrix.
Figure 5E:
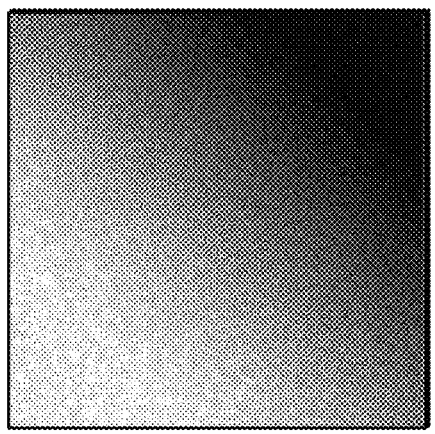
FIG. 5E is a diagram for explaining an influence of a difference in the number of tone levels of a threshold value matrix of a blue noise mask.
Figure 5A:
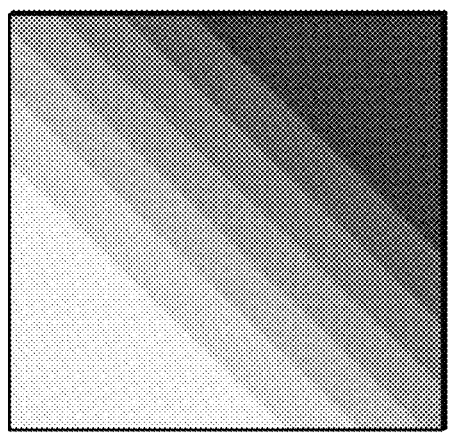
FIG. 5A is a diagram for explaining an influence of a difference in the number of tone levels of a dot concentration type threshold value matrix.
Figure 5D:
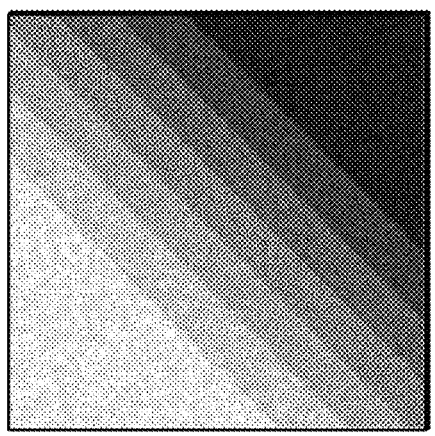
FIG. 5D is a diagram for explaining an influence of a difference in the number of tone levels of a threshold value matrix of a blue noise mask.

FIG. 5A to FIG. 5F are diagrams for explaining the influence of a difference in the number of tone levels between the dot concentration type threshold value matrix and the threshold value matrix of a blue noise mask. FIG. 5A, FIG. 5B, and FIG. 5C illustrate the results of the halftone processing by the dot concentration type threshold value matrix in an image in which the density changes darker from the top left toward the bottom right. Further, FIG. 5D, FIG. 5E, and FIG. 5F illustrate the results of the halftone processing by the threshold value matrix of a blue noise mask in an image in which the density changes darker from the top left toward the bottom right.

FIG. 5A and FIG. 5D are results of performing processing by taking the number of bits of the threshold value of the threshold value matrix to be six, FIG. 5B and FIG. 5E are those by taking the number of bits of the threshold value of the threshold value matrix to be eight, and FIG. 5C and FIG. 5F are those by taking the number of bits of the threshold value of the threshold value matrix to be ten.

First, by referring to FIG. 5A, FIG. 5B, and FIG. 5C, the halftone dots are arranged regularly, and therefore, as shown in FIG. 5C, FIG. 5B, and FIG. 5A, as the number of tone levels of the threshold value becomes smaller in this order, a step in tone level becomes more conspicuous. Next, by referring to FIG. 5D, FIG. 5E, and FIG. 5F, the blue noise mask includes random noise, and therefore, it is known that there is a tendency for a step in tone level to become less conspicuous.

In the case where FIG. 5B and FIG. 5E are compared with respect to the step in tone level, in which the number of bits of the threshold value of the threshold value matrix is the same, that is, eight, it is known that the results in FIG. 5E are less conspicuous than those in FIG. 5B. Further, from the results shown in FIG. 5E, it is known that sufficient image quality can be achieved by setting the number of bits of the threshold value of the threshold value matrix to eight in the threshold value matrix of a blue noise mask.

As above, from the processing results in FIG. 4A to FIG. 4F, the size of the threshold value matrix held in the matrix storage unit 303 of a blue noise mask is set larger than the size of the threshold value matrix held in the dot concentration type matrix storage unit 302. That is, the number (R) of threshold values held in the matrix storage unit 303 of a blue noise mask is set larger than the number (S) of threshold values held in the dot concentration type matrix storage unit 302. That is, the numbers of threshold values are set so that S<R holds.

In addition, from the processing results in FIG. 5A to FIG. 5F, in the present embodiment, the number of bits of the threshold value held in the dot concentration type matrix storage unit 302 of the halftone processing unit 203 is set to ten. Further, the number of bits of the threshold value held in the matrix storage unit 303 of a blue noise mask of the halftone processing unit 203 is set to eight.

As a supplement, a reduction in the amount of memory of the threshold value held in the matrix storage unit 303 of a blue noise mask of the halftone processing unit 203 is explained by a comparison with the conventional case. Conventionally, in accordance with the maximum value of the necessary number of tone levels, the number of bits of the threshold value held in the matrix storage unit 303 of a blue noise mask is determined. Because of this, as the amount of memory of the threshold value held in the matrix storage unit 303 of a blue noise mask of the halftone processing unit 203, the value obtained by multiplying the number of threshold values H×I and the number of bits of the threshold value, that is, ten (H×I×10 (bits)) is necessary.

In contrast to this, in the present embodiment, the number of bits of the threshold value is set to eight, and therefore, as the amount of memory of the threshold value held in the matrix storage unit 303 of a blue noise mask, the value obtained by multiplying the number of threshold values H×I and the number of bits, that is, eight (H×I×8 (bits)) is enough. Consequently, compared to the conventional method, it is made possible to reduce the amount of memory held in the matrix storage unit 303 of a blue noise mask by ⅕.

[Procedure of Halftone Processing]

Figure 6:
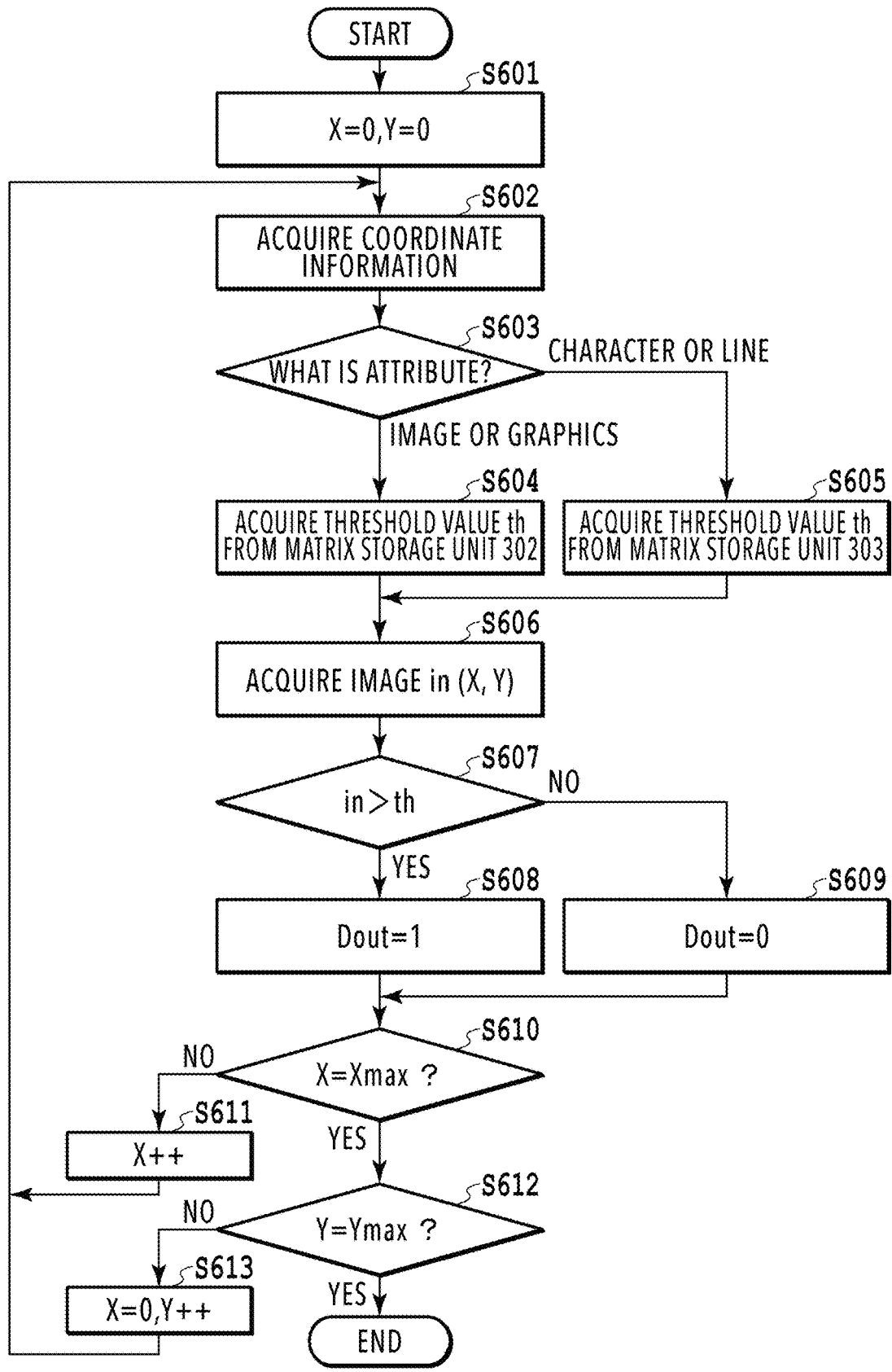
FIG. 6 is a flowchart showing a procedure of halftone processing performed in the halftone processing unit.

Next, by using the flowchart in FIG. 6, the procedure of the halftone processing performed in the halftone processing unit 203 is explained. The coordinate specification unit 301 performs initialization of the coordinate information by substituting 0 for the coordinate information (X, Y) (S601). After performing initialization of the coordinate information, the coordinate specification unit 301 notifies the threshold value acquisition unit 304 of the coordinate information (X, Y) (S602).

The threshold value acquisition unit 304 selects the matrix storage unit from which a threshold value is acquired based on attribute information (S603). That is, the threshold value acquisition unit 304 selects the dot concentration type matrix storage unit 302 or the matrix storage unit 303 of a blue noise mask.

Here, explanation is supplemented for the processing to select the dot concentration type threshold value matrix or the threshold value matrix of a blue noise mask in accordance with attribute information. The image data of the present embodiment includes a plurality of pixels and each pixel has a predetermined pixel value. In the RGB pixel data, each pixel has luminance values of three components of R, and B and in the CMYK image data, each pixel has density values of four components of C, M, Y, and K. Further, the image data has attribute data associated for each pixel. This indicates the type of an object to which each pixel belongs and for each pixel, corresponding image processing is performed in accordance with the type of the attribute that is associated.

For example, for the pixel of the image attribute or the graphics attribute, smooth gradation properties are required, and therefore, processing that regards gradation properties as important is applied and for the pixel of the character attribute, visual recognizability is required, and therefore, processing that regards resolution as important is applied. Consequently, in the present embodiment, in the case where the attribute of the pixel is the image attribute, a dot concentration type screen whose screen ruling is low is applied in the halftone processing unit 203 and in the case where the attribute of the pixel is the character attribute, a blue noise mask whose resolution is high is applied in the halftone processing unit 203.

The attribute data is generated in accordance with the type of a PDL (Page Description Language) command at the time of the image data of a page being generated by rendering based on the PDL command. For example, in the case of the PDL command for drawing a character, the attribute of the pixel making up the object generated by the PDL command is the character attribute (TEXT). Then, the generated attribute data and the image data are associated with each other.

Returning to FIG. 6, in the case where the attribute information is image or graphics, as described above, based on the coordinate information (X, Y), the threshold value th is acquired from the dot concentration type matrix storage unit 302 (S604). Further, in the case where the attribute information is character, based on the coordinate information (X, Y), the threshold value th is acquired from the matrix storage unit 303 of a blue noise mask (S605). After acquiring the threshold value th from the dot concentration type matrix storage unit 302 or the matrix storage unit 303 of a blue noise mask, the threshold value acquisition unit 304 outputs the acquired threshold value th to the comparison unit 305.

Next, the comparison unit 305 acquires the image IN (X, Y) from the bit conversion unit 306 (S606). The bit conversion unit 306 performs bit conversion in accordance with the attribute information. In more detail, in the case where the attribute information is character, the bit conversion unit 306 performs bit conversion so as to match the number of bits of the threshold value held in the matrix storage unit 303 of a blue noise mask with the number of bits of the threshold value of the pixel of interest. Specifically, in the case where the attribute information is character, the bit conversion unit 306 outputs the high-order eight bits of the pixel value of the pixel of interest to the comparison unit 305 as the image IN (X, Y).

The comparison unit 305 compares the image IN (X, Y) and the threshold value th (S607) and in the case where the image IN (X, Y) is larger than the threshold value th, the comparison unit 305 outputs "1" (S608) and in the case where the image IN (X, Y) is smaller than or equal to the threshold value th, outputs "0" (S609).

In the case where the comparison processing of the image IN (X, Y) and the threshold value th has been completed in the comparison unit 305, the coordinate specification unit 301 compares whether or not X and Xmax that is the number of pixels of the main scan coincide with each other (S610). In the case where X and Xmax do not coincide with each other at step S610 (S610 No), the pixel (pixel of interest) is shifted in the main scanning direction by one pixel by incrementing the value of X (S611).

Further, in the case where X and Xmax coincide with each other at step S610 (S610 Yes), whether or not Y and Ymax that is the number of pixels of the sub scan coincide with each other is compared (S612). That is, whether or not the processing has been performed for all the pixels is determined. In the case where Y and Ymax coincide with each other at step S612 (S612 Yes), it is determined that the processing has been performed for all the pixels and the processing shown in FIG. 6 is terminated. Further, in the case where Y and Ymax do not coincide with each other (S612 No), the coordinate specification unit 301 returns the image (pixel of interest) to the top in the main scanning direction and shifts in the sub scanning direction by one pixel by substitutes 0 for X and incrementing the value of Y (S613).

[Outline of Halftone Processing]

Figure 7A:
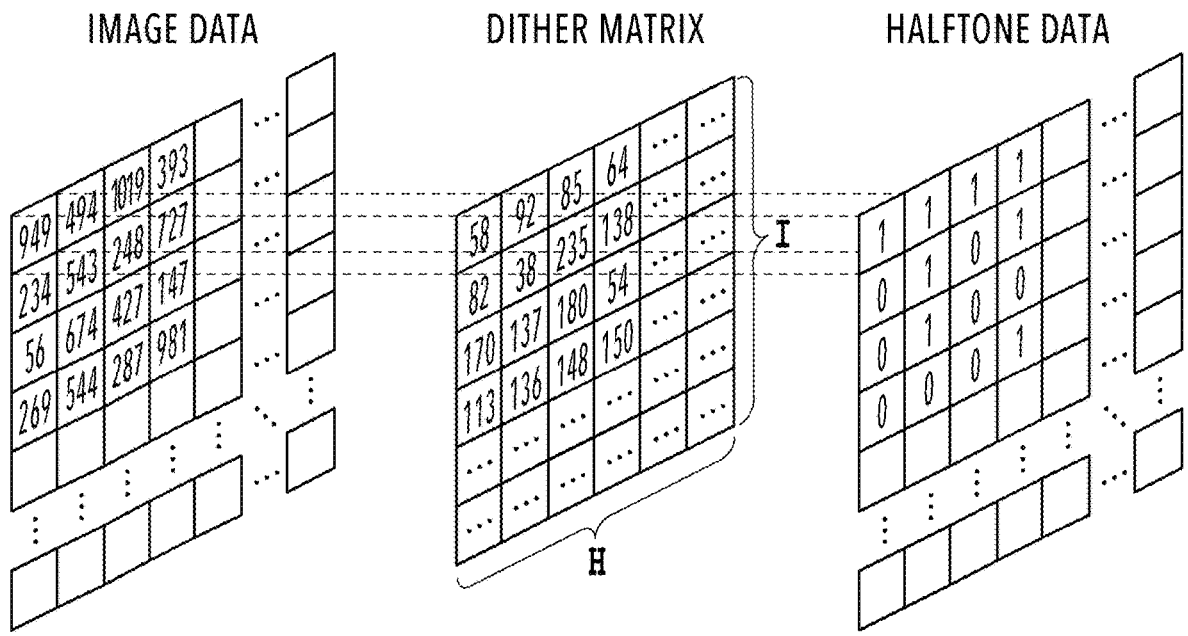
FIG. 7A is a diagram for explaining an outline of processing in the halftone processing unit.
Figure 7B:
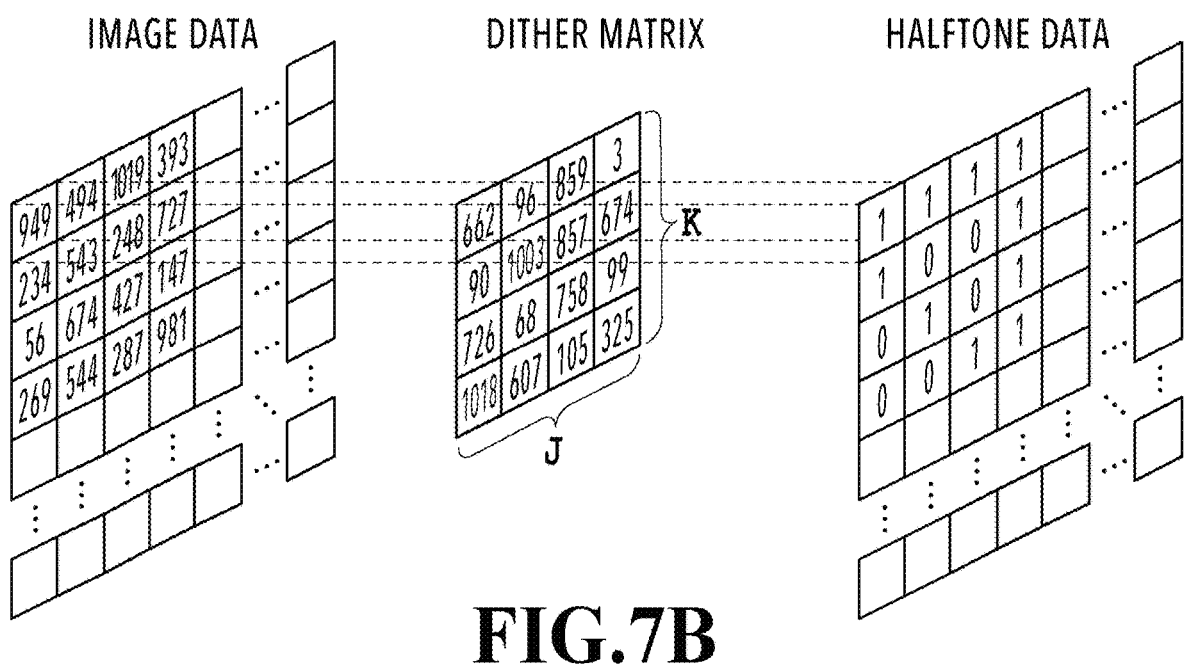
FIG. 7B is a diagram for explaining an outline of processing in the halftone processing unit.

Next, by using FIG. 7A and FIG. 7B, the halftone processing shown in FIG. 6 is supplemented. FIG. 7A and FIG. 7B are diagrams for explaining the outline of the processing in the halftone processing unit 203 and FIG. 7A is a processing example in the threshold value matrix of a blue noise mask and FIG. 7B is a processing example in the dot concentration type threshold value matrix. The threshold value matrix is applied in a tiled manner with a period of K pixels in the horizontal direction and L pixels in the vertical direction of the image data. Further, here, for convenience of explanation, it is assumed that initialization of the coordinate information (X, Y) is performed by the coordinate specification unit 301 (S601) and the threshold value acquisition unit 304 is already notified of the coordinate information (0, 0).

First, the case is explained where "character" or "line" is acquired as the attribute information and the matrix storage unit 303 of a blue noise mask is selected at step S603. As described above, the coordinate information is (0, 0), and therefore, the top-left pixel of the image data is selected as the pixel of interest, the threshold value th 58 corresponding to the pixel is acquired (S605), and output to the comparison unit 305.

Next, the comparison unit 305 acquires the image IN (X, Y) from the bit conversion unit 306. In this case, with respect to the top-left pixel of the image data, the image IN (0, 0) is 949 and further, in order to mach the numbers of bits, bit conversion is performed into eight bits (949>>2=237), and thereby, 237 is acquired.

Furthermore, the comparison unit 305 compares the image IN (X, Y) and the threshold value th (S607). That is, 237, which is the image IN (X, Y), and 58, which is the threshold value th, are compared. Then, in this case, the image IN (X, Y) is larger than the threshold value th, and therefore, 1 is output. That is, 1 is set to the coordinate corresponding to the halftone data in FIG. 7A.

Following the above, the case is explained where "image" or "graphics" is acquired as the attribute information and the dot concentration type matrix storage unit 302 is selected at step S603. As described above, the coordinate information is (0, 0), and therefore, the top-left pixel of the image data is selected as the pixel of interest, the threshold value th 662 corresponding to the pixel is acquired (S605), and output to the comparison unit 305.

Next, the comparison unit 305 acquires the image IN (X, Y) from the bit conversion unit 306. In this case, with respect to the top-left pixel of the image data, the image IN (0, 0) is 949. In this case, the number of bits of the threshold value held in the dot concentration type matrix storage unit 302 is ten and the same as the number of bits of the pixel value of the pixel of interest, and therefore, the pixel value is acquired without performing bit conversion by the bit conversion unit 306. That is, as the image IN (0, 0), 949 is acquired.

Further, the comparison unit 305 compares the image IN (X, Y) and the threshold value th. That is, 949, which is the image IN (X, Y) and 662, which is the threshold value, are compared. Then, in this case, the image IN (X, Y) is larger than the threshold value th, and therefore, 1 is output. That is, 1 is set to the coordinate corresponding to the halftone data in FIG. 7B.

As described above, by making the number of bits of the threshold value held in the matrix storage unit 303 of a blue noise mask smaller than the number of bits of the threshold value held in the dot concentration type matrix storage unit 302, it is possible to reduce the circuit scale of the image processing unit 105 while maintaining the necessary image quality. In the present embodiment, the case where the image processing unit 105 is an ASIC or ASIP and the halftone processing is realized by the ASIC or ASIP is illustrated, but the present invention is not limited to this. The present invention can also be applied to a case where halftone processing is realized by using a circuit constituting, for example, a general-purpose hardware processor or DSP and programs. In this case, it is possible to reduce the calculation cost according to halftone processing.

In the present embodiment, the number of bits of the threshold value is matched by bit-shifting the input image in the bit conversion unit 306, but it may also be possible to match the number of bits with that of the input image by bit-shifting the threshold value acquired from the matrix storage unit 303 of a blue noise mask. Further, in the present embodiment, the number of bits is reduced by performing bit shifting, but in the case of extending the number of bits, it is possible to extend the number of bits by copying the high-order bits to the low-order bits. In addition, it may also be possible to add a generated random number to the low-order bits by generating the random number by a random number generator, such as a Fibonacci LFSR and a Galois LFSR.

Second Embodiment

In the first embodiment, the circuit scale or calculation cost is reduced by making the number of bits of the threshold value of the matrix of a blue noise mask smaller than the number of bits of the threshold value of the dot concentration type matrix in accordance with the characteristics of the threshold value matrix. Consequently, in a second embodiment, in the case where one pixel is compared with a plurality of different threshold values in the halftone processing, it is discussed that the number of threshold values compared for one pixel is changed in accordance with the characteristics of the threshold value matrix.

In the second embodiment, it is assumed that the print engine 22 is capable of processing image data having four bits per pixel (that is, 16 tone levels). Further, in the following explanation, the difference from the first embodiment is explained mainly.

[Halftone Processing]

In the following, by using FIG. 8 to FIG. 11A and FIG. 11B, the configuration and processing of the halftone processing unit 203 in an image processing apparatus according to the present embodiment are explained. In the present embodiment, explanation is given on the assumption that the number of pixels of the main scan of an input image is Xmax and the number of pixels of the sub scan is Ymax. Further, in the present embodiment, one color of the four CMYK colors is explained, but it is assumed that the halftone processing is performed for all CMYK.

[Configuration of Halftone Processing Unit]

Figure 8:
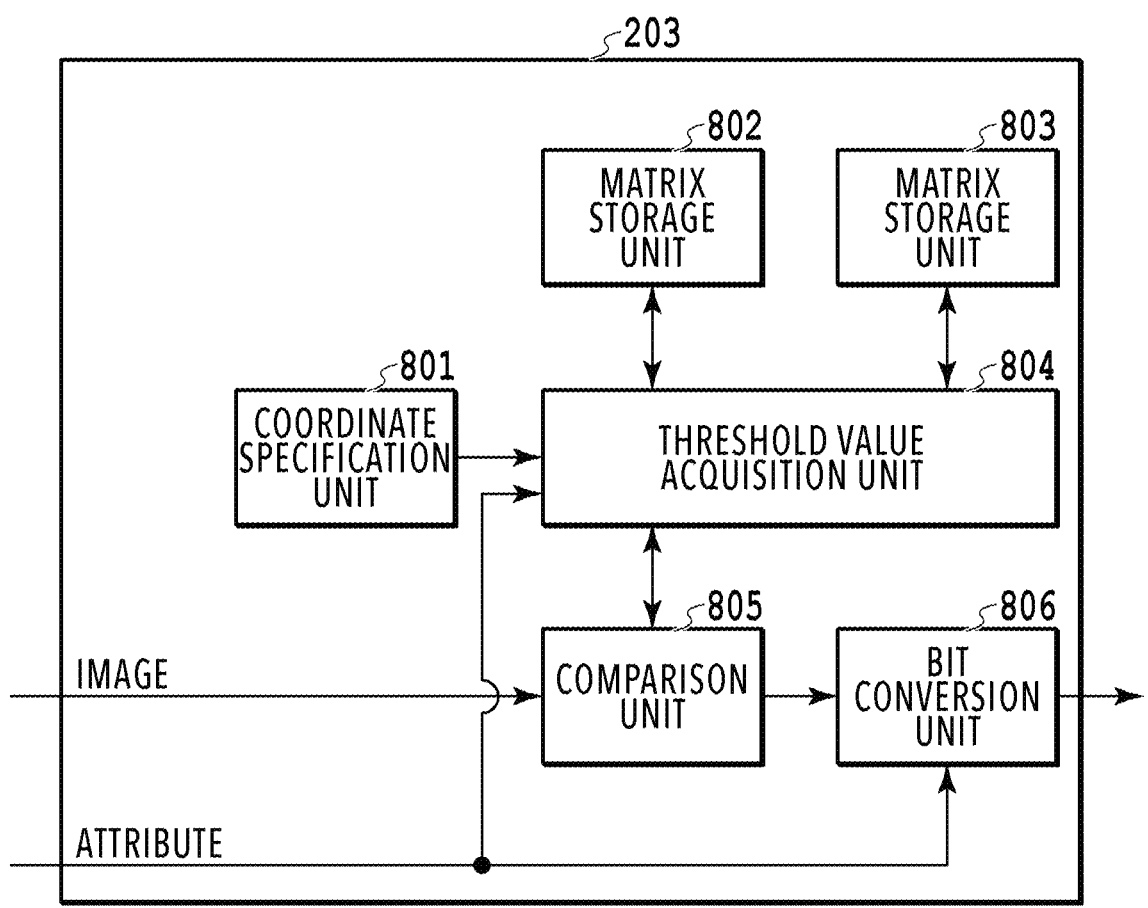
FIG. 8 is a block diagram showing a configuration of the halftone processing unit.

FIG. 8 is a block diagram of the halftone processing unit 203. A coordinate specification unit 801 specifies the coordinates of an image (pixel of interest) in the case where halftone processing is performed. After specifying the coordinates of the pixel of interest, the coordinate specification unit 801 transmits the specified coordinates to a threshold value acquisition unit 804 (notifies a threshold value acquisition unit 804 of the specified coordinates). A dot concentration type matrix storage unit 802 stores (holds) the threshold value th set by a predetermined number of bits at the coordinates (X, Y), which is selected in the case where the attribute information is determined to be image or graphics. As will be described later, the dot concentration type matrix storage unit 802 stores 15 threshold value matrixes. A matrix storage unit 803 of a blue noise mask stores (holds) the threshold value th set by a predetermined number of bits at the coordinates (X, Y), which is selected in the case where the attribute information is determined to be character or line. As will be described later, the matrix storage unit 803 of a blue noise mask stores one threshold value matrix.

In the case of being notified of the coordinate information (X, Y) by the coordinate specification unit 801, the threshold value acquisition unit 804 acquires the threshold value corresponding to the image position (coordinate information) from the dot concentration type matrix storage unit 802 or the matrix storage unit 803 of a blue noise mask in accordance with the attribute.

A comparison unit 805 compares the pixel value of the image IN (X, Y) and the threshold value th acquired from the dot concentration type matrix storage unit 802 or the matrix storage unit 803 of a blue noise mask. In the case where the results of the comparison indicate that the pixel value of the image IN (X, Y) is larger the threshold value th, the comparison unit 805 returns 1 and in the case where the pixel value of the image IN (X, Y) is smaller than or equal to the threshold value th, returns 0.

In the case where the attribute information is "image" or "graphics", the value of the pixel of interest is compared with threshold values set stepwise in each threshold value matrix of first to 15th levels stored in the dot concentration type matrix storage unit 802 and the value obtained by adding up the comparison results is output. A bit conversion unit 806 multiplies the value by a predetermined number and outputs in order to match the maximum values of the output values with each other in the case where the threshold value matrix of a blue noise mask is selected.

[Characteristics and Threshold Value of Threshold Value Matrix]

Next, by using FIG. 9A to FIG. 9D, the characteristics of the dot concentration type threshold value matrix and the threshold value matrix of a blue noise mask are explained. FIG. 9A to FIG. 9D are diagrams for explaining a difference in the processing results due to a difference in the number of output tone levels between the dot concentration type threshold value matrix and the threshold value matrix of a blue noise mask.

Figure 9A:
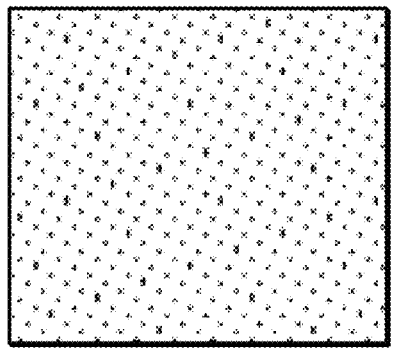
FIG. 9A is a diagram for explaining a difference in processing results due to a difference in the number of output tone levels of a dot concentration type threshold value matrix.
Figure 9B:
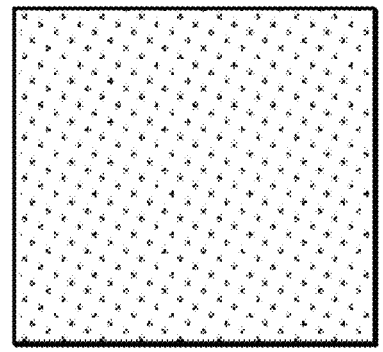
FIG. 9B is a diagram for explaining a difference in processing results due to a difference in the number of output tone levels of a dot concentration type threshold value matrix.
Figure 9C:
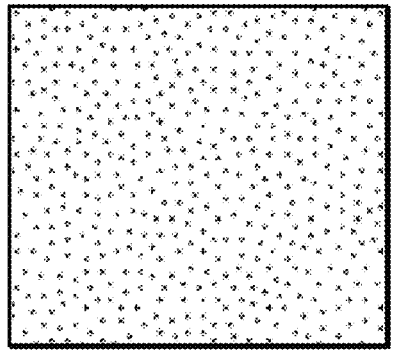
FIG. 9C is a diagram for explaining a difference in processing results due to a difference in the number of output tone levels of a threshold value matrix of a blue noise mask.
Figure 9D:
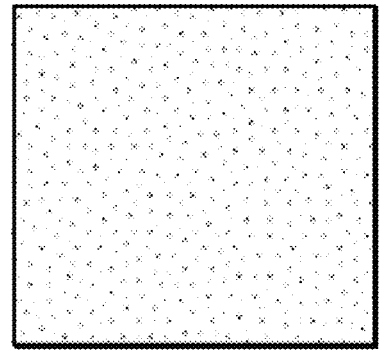
FIG. 9D is a diagram for explaining a difference in processing results due to a difference in the number of output tone levels of a threshold value matrix of a blue noise mask.

FIG. 9A and FIG. 9B illustrate results of the halftone processing by the dot concentration type threshold value matrix at a predetermined density. Further, FIG. 9C and FIG. 9D illustrate results of the halftone processing by the threshold value matrix of a blue noise mask at a predetermined density. FIG. 9A and FIG. 9C show the case where the number of output tone levels of the threshold value matrix is set to two (one bit) and FIG. 9B and FIG. 9D show the case where the number of output tone levels of the threshold value matrix is set to 16 (four bits).

First, by referring to FIG. 9A, it is known that a texture pattern occurs with a period longer than the period of the original halftone dots. Further, from FIG. 9B in which the number of output tone levels is 16, it is known that the texture pattern becomes less conspicuous.

Next, by referring to FIG. 9C, it is known that the texture pattern as shown in FIG. 9A does not occur. This results from that random noises are included and the component thereof has a frequency that is not visually recognized by the human eye easily.

As above, from the processing results in FIG. 9A to FIG. 9D, in the present embodiment, the number of output tone levels of the dot concentration type threshold value matrix of the halftone processing unit 203 is set to 16. That is, 15 threshold values are set per pixel. Further, as the number of output tone levels of the threshold value matrix of a blue noise mask, one is sufficient, and therefore, the number is set to one. That is, one threshold value is set per pixel. That is, in the case where the number of dot concentration type threshold value matrixes is taken to be O and the number of threshold value matrixes of a blue noise mask is taken to be P, O and P are set so that O>P holds.

In the present embodiment, it is possible for the print engine 22 to process image data having four bits per pixel (that is, 16 tone levels). Here, in the case of the halftone processing with 16 tone levels, as will be shown in FIG. 11B, to be described later, threshold value matrixes of first level to 15th level (Level 1 to Level 15) are set. Further, in the halftone processing, the value of the pixel of interest is compared with the relevant threshold value in each threshold value matrix of the first level to the 15th level and the value obtained by adding up the comparison results is output. Then, this output value corresponds to the 4-bit tone level value after the halftone processing.

As a supplement, a reduction in the amount of memory of the threshold value held in the matrix storage unit 803 of a blue noise mask of the halftone processing unit 203 is explained by a comparison with the conventional case. Conventionally, in accordance with the number of tone levels that the print engine 22 can process, the number of threshold value matrixes per pixel is determined. Because of this, as the amount of memory of the threshold value held in the matrix storage unit 803 of a blue noise mask of the halftone processing unit 203, the value obtained by multiplying the number of threshold values H×I by the number of bits and the number of threshold value matrixes is necessary. That is, H×I×10 (bits)×15 are necessary.

In contrast to that, in the present embodiment, the number of threshold value matrixes is set to one, and therefore, as the amount of memory of the threshold value held in the matrix storage unit 803 of a blue noise mask, the value obtained by multiplying the number of threshold values H×I by the number of bits and one, which is the number of threshold value matrixes, is enough. That is, H×I×10 (bits)×1 are enough. Consequently, from this, compared to the conventional method, it is made possible to reduce the amount of memory held in the matrix storage unit 803 of a blue noise mask by 4/15.

[Procedure of Halftone Processing]

Figure 10:
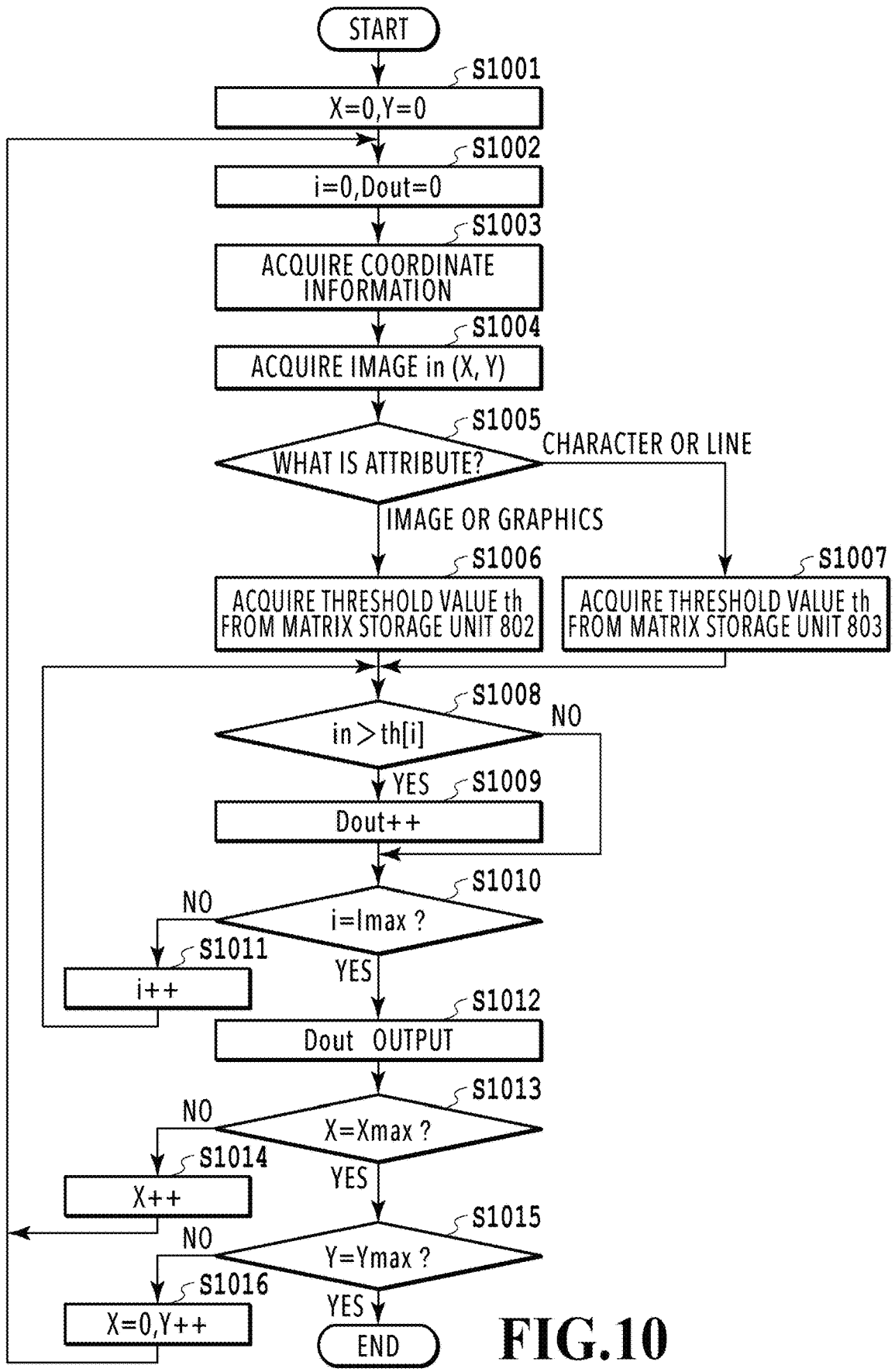
FIG. 10 is a flowchart showing a procedure of halftone processing performed in the halftone processing unit.

Next, by using the flowchart in FIG. 10, the procedure of the halftone processing performed in the halftone processing unit 203 is explained. The coordinate specification unit 801 performs initialization of coordinate information by substituting 0 for the coordinate information (X, Y) (S1001). The comparison unit 805 initializes a threshold value level i and an output Dout by substituting 0 for the threshold value level i and the output Dout (S1002). After performing initialization of the coordinate information, the coordinate specification unit 801 notifies the threshold value acquisition unit 804 of the coordinate information (X, Y) (S1003).

Next, the comparison unit 805 acquires the image IN (X, Y) (S1004). The threshold value acquisition unit 804 selects the matrix storage unit from which a threshold value is acquired based on attribute information (S1005). That is, the comparison unit 805 selects the dot concentration type matrix storage unit 802 or the matrix storage unit 803 of a blue noise mask.

In the case where the attribute information is image or graphics, based on the coordinate information (X, Y), the threshold value th is acquired from the dot concentration type matrix storage unit 802 (S1006). Further, in the case where the attribute information is character, based on the coordinate information (X, Y), the threshold value th is acquired from the matrix storage unit 803 of a blue noise mask (S1007). After acquiring the threshold value th from the dot concentration type matrix storage unit 802 or the matrix storage unit 803 of a blue noise mask, the threshold value acquisition unit 804 outputs the acquired threshold value th to the comparison unit 805.

Next, the comparison unit 805 compares the image IN (X, Y) and a threshold value th [i] (S1008). Then, in the case where the image IN (X, Y) is larger than the threshold value th [i], 1 is added to Dout (S1009), and in the case where the image IN (X, Y) is smaller than or equal to the threshold value th [i], the comparison unit 805 advances the processing to step S1010.

The comparison unit 805 determines whether or not the comparison with all the threshold values corresponding to one pixel has been completed (S1010). Specifically, the comparison unit 805 compares the threshold value level i and Imax and determines whether or not the threshold value level i and Imax coincide with each other. Then, in the case where the threshold value level i and Imax do not coincide with each other (S1010 No), the comparison unit 805 advances the processing to S1011 and increments the threshold value level i in order to compare the image IN (X, Y) and the threshold value of the next threshold value level i. Further, in the case where the threshold value level i and Imax coincide with each other (S1010 Yes), the comparison unit 805 determines that the comparison with all the threshold values corresponding to one pixel has been completed and advances the processing to step S1012 and outputs Dout (S1012).

Imax is indicated as the total number of threshold value matrixes. In the present embodiment, the total number of threshold value matrixes of a blue noise mask is one, and therefore, Imax is one and Dout is a value of 0 or 1. On the other hand, the total number of dot concentration type threshold value matrixes is 15, and therefore, Imax is 15 and Dout takes a value from 0 to 15. Because of this, in the case where the threshold value matrix of a blue noise mask is selected, the bit conversion unit 806 outputs Dout by multiplying Dout by 15 in order to match the maximum values of the output values with each other.

In the case where the comparison unit 805 outputs Dout, the coordinate specification unit 801 determines whether or not X coincides with Xmax that is the number of pixels of the main scan (S1013). In the case where X and Xmax do not coincide with each other at step S1013 (S1013 No), the image (pixel of interest) is shifted in the main scanning direction by one pixel by incrementing the value of X (S1014).

Further, in the case where X and Xmax coincide with each other at step S1013 (S1013 Yes), whether or not Y matches with Ymax that is the number of pixels of the sub scan (S1015). That is, whether or not the processing has been performed for all the pixels is determined. In the case where Y and Ymax coincide with each other at step S1015 (S1015 Yes), it is determined that the processing has been performed for all the pixels and the processing shown in FIG. 10 is terminated. On the other hand, in the case where Y and Ymax do not coincide with each other (S1015 No), the coordinate specification unit 801 returns the image (pixel of interest) to the top in the main scanning direction and shifts in the sub scanning direction by one pixel by substituting 0 for X and incrementing the value of Y (S1016).

[Outline of Halftone Processing]

Figure 11A:
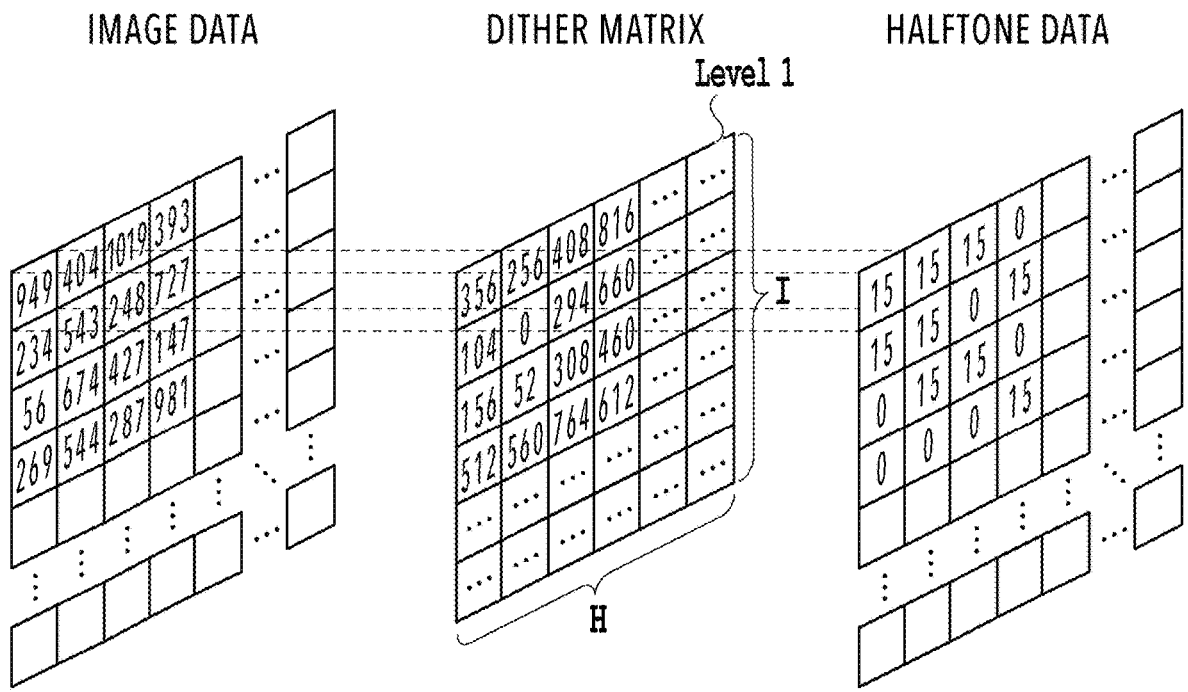
FIG. 11A is a diagram for explaining an outline of processing in the halftone processing unit.
Figure 11B:
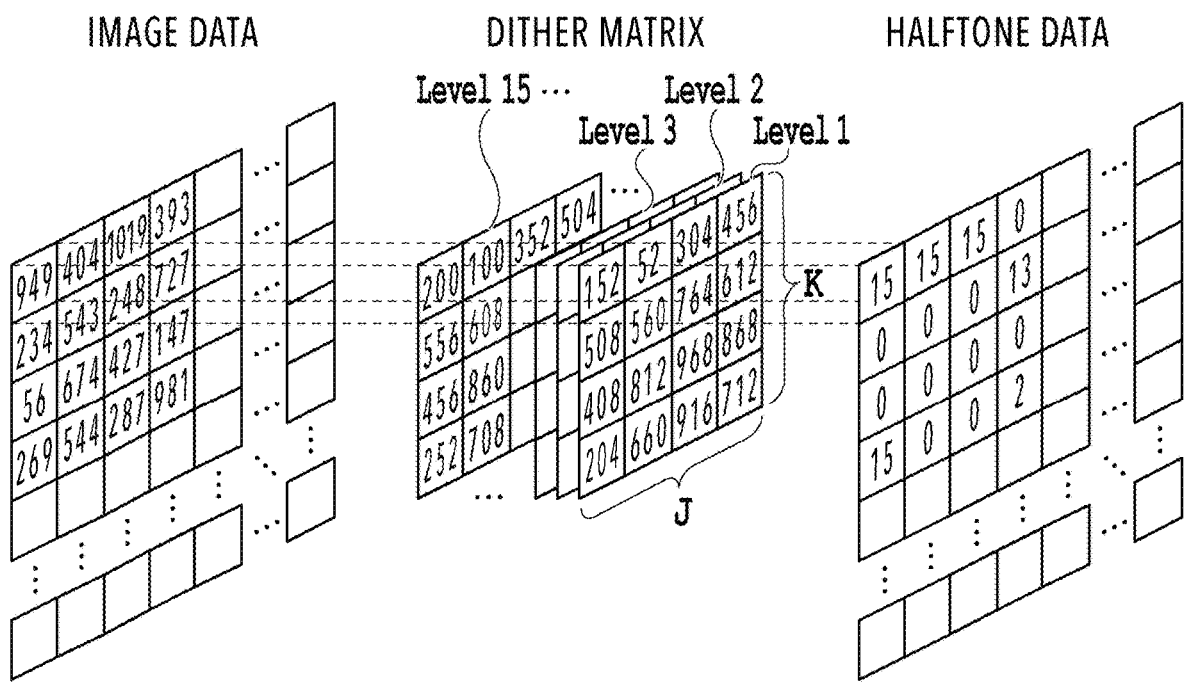
FIG. 11B is a diagram for explaining an outline of processing in the halftone processing unit.

Next, by using FIG. 11A and FIG. 11B, the halftone processing shown in FIG. 10 is supplemented. FIG. 11A and FIG. 11B are diagrams for explaining the outline of the processing in the halftone processing unit 203, and FIG. 11A is a processing example in the threshold value matrix of a blue noise mask and FIG. 11B is a processing example in the dot concentration type threshold value matrix. Here, for convenience of explanation, it is assumed that initialization of the coordinate information (X, Y) is performed by the coordinate specification unit 801 (S1001) and the threshold value acquisition unit 804 is already notified of the coordinate information (0, 0).

First, the case is explained where "character" or "line" is acquired as the attribution information and the matrix storage unit 803 of a blue noise mask is selected at step S1005. As described above, the coordinate information is (0, 0), and therefore, the top-left pixel of the image data is selected as the pixel of interest and 949 is acquired as the image IN (0, 0) (S1004).

Next, the threshold value th [0] corresponding to the pixel of interest is output to the comparison unit 805 as 356 (S1007). In this case, because the image IN (0, 0) is 949 and the threshold value th [0] is 356, the image IN (0, 0) is larger than the threshold value th [0], and therefore, 1 is added to Dout. At the time of outputting, Dout is multiplied by 15.

Following the above, the case is explained where "image" or "graphics" is acquired as the attribute information and the dot concentration type matrix storage unit 802 is selected at step S1005. As described above, the coordinate information is (0, 0), and therefore, the top-left pixel of the image data is selected as the pixel of interest and as the image IN (0, 0), 949 is acquired (S1004).

Next, the threshold value th [0] corresponding to the pixel of interest is output to the comparison unit 805 as 152 (S1006). In this case, because the image IN (0, 0) is 949 and the threshold value th [0] is 152, the image IN (0, 0) is larger than the threshold value th [0], and therefore, 1 is added to Dout.

In the case where the attribute information is "image" or "graphics", the same processing is performed repeatedly by incrementing i. Then, in the case where the pixel of interest is the top-left pixel of the image data, 15 is output as Dout.

As above, it is possible to reduce the circuit scale or calculation cost while maintaining necessary image quality by making the number of threshold value matrixes held in the matrix storage unit 803 of a blue noise mask smaller than the number of threshold value matrixes held in the dot concentration type matrix storage unit 802.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, in the above-described embodiment, explanation is given by taking the threshold value matrix of a blue noise mask having frequency modulation characteristics (that is, blue noise characteristics) as an example of the dot distribution type threshold value matrix, but it is also possible to apply the embodiment to the green noise characteristics whose distribution band is at an intermediate frequency.

According to the present invention, in the halftone processing, it is possible to reduce the circuit scale or calculation cost on the premise that necessary image quality is maintained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-131875, filed Jul. 5, 2017, which is hereby incorporated by reference herein in its entirety.

What is claimed is:

1. An image processing apparatus comprising:
a memory unit configured to store a dither matrix of a dot concentration type and a dither matrix of a dot distribution type, wherein the dither matrix of the dot concentration type is smaller than the dither matrix of the dot distribution type, and each threshold value of the dither matrix of the dot concentration type has a higher bit number than each threshold value of the dither matrix of the dot distribution type,
wherein the image processing apparatus performs halftone processing on image data by using the dither matrix of the dot concentration type or the dither matrix of the dot distribution type.

2. The image processing apparatus according to claim 1, wherein the dither matrix of the dot concentration type is a dot concentration type threshold value matrix having amplitude modulation characteristics, and
wherein the dither matrix of the dot distribution type is a dot distribution type threshold value matrix having frequency modulation characteristics.

3. The image processing apparatus according to claim 2, wherein the frequency modulation characteristics are blue noise characteristics or green noise characteristics.

4. The image processing apparatus according to claim 1, wherein the dither matrix of the dot concentration type includes S threshold values, and
wherein the dither matrix of the dot distribution type includes R (S<R) threshold values.

5. The image processing apparatus according to claim 1, wherein in a case where the attribute information is image or graphics, the dither matrix of the dot concentration type is selected, and
wherein in a case where the attribute information is character or line, the dither matrix of the dot distribution type is selected.

6. The image processing apparatus according to claim 1, wherein the image processing apparatus further causes performing conversion processing to convert a pixel value of the image data, which is represented by a number of tone levels of M bits or more, into a pixel value of M bits, and
wherein in a case where the dither matrix of the dot distribution type is selected, the halftone processing is performed for image data including a pixel value converted by the conversion processing.

7. The image processing apparatus according to claim 1, wherein the image processing apparatus further causes performing printing processing to print an image based on data obtained as results of the halftone processing.

8. The image processing apparatus according to claim 1, wherein when performing the halftone processing on the image data, each image value of the image data is compared with a threshold value of the dither matrix of the dot concentration type or the dither matrix of the dot distribution type,
wherein when an image value of the image data is compared with a threshold value of the dither matrix of the dot concentration type, all bits of the image value are used, and
wherein when an image value of the image data is compared with a threshold value of the dither matrix of the dot distribution type, only the high-order bits of the image value are used.

9. An image processing method in an image processing apparatus comprising a memory unit configured to store a dither matrix of a dot concentration type and a dither matrix of a dot distribution type, wherein the dither matrix of the dot concentration type is smaller than the dither matrix of the dot distribution type, and each threshold value of the dither matrix of the dot concentration type has a higher bit number than each threshold value of the dither matrix of the dot distribution type, the image processing method comprising:
performing halftone processing on image data by using the dither matrix of the dot concentration type or the dither matrix of the dot distribution type.

10. A non-transitory computer-readable storage medium storing a program for causing a computer to function as an image processing apparatus comprising:
a memory unit configured to store a dither matrix of a dot concentration type and a dither matrix of a dot distribution type, wherein the dither matrix of the dot concentration type is smaller than the dither matrix of the dot distribution type, and each threshold value of the dither matrix of the dot concentration type has a higher bit number than each threshold value of the dither matrix of the dot distribution type,
wherein the image processing apparatus performs halftone processing on image data by using the dither matrix of the dot concentration type or the dither matrix of the dot distribution type.

11. An apparatus comprising:
a memory unit configured to store a dither matrix of a dot concentration type and a dither matrix of a dot distribution type, wherein a number of thresholds of the dither matrix of the dot concentration type is less than a number of thresholds of the dither matrix of the dot distribution type, and each threshold value of the dither matrix of the dot concentration type has a higher bit number than each threshold value of the dither matrix of the dot distribution type,
wherein halftone processing on image data is performed by using the dither matrix of the dot concentration type or the dither matrix of the dot distribution type.

* * * * *